(12) United States Patent
Milanese

(10) Patent No.: US 11,304,582 B2
(45) Date of Patent: Apr. 19, 2022

(54) CLEANER WITH HOT PLATE FOR FLOORS PROVIDED WITH A SANDWICH PANEL FOR HEATING AND GRADUAL RELEASING OF THE WATER TO AN UNDERLYING CLEANING CLOTH

(71) Applicant: Pier Antonio Milanese, Susegana (IT)

(72) Inventor: Pier Antonio Milanese, Susegana (IT)

( * ) Notice: Subject to any disclaimer, the term of this patent is extended or adjusted under 35 U.S.C. 154(b) by 880 days.

(21) Appl. No.: 16/083,591

(22) PCT Filed: Mar. 14, 2017

(86) PCT No.: PCT/IT2017/000051
§ 371 (c)(1),
(2) Date: Sep. 10, 2018

(87) PCT Pub. No.: WO2017/158631
PCT Pub. Date: Sep. 21, 2017

(65) Prior Publication Data
US 2020/0329940 A1    Oct. 22, 2020

(30) Foreign Application Priority Data

Mar. 15, 2016    (IT) .......................... IT102016000027284

(51) Int. Cl.
*A47L 11/40*    (2006.01)
*B32B 5/24*    (2006.01)
(Continued)

(52) U.S. Cl.
CPC ....... *A47L 11/4086* (2013.01); *A47L 11/4036* (2013.01); *A47L 11/4075* (2013.01);
(Continued)

(58) Field of Classification Search
CPC ............. A47L 11/4086; A47L 11/4088; A47L 11/4083; A47L 11/4036; A47L 11/408;
(Continued)

(56) References Cited

U.S. PATENT DOCUMENTS

| 7,996,949 B2 | 8/2011 | Rosenzweig et al. |
| 8,522,388 B2 | 9/2013 | Jiang et al. |

(Continued)

FOREIGN PATENT DOCUMENTS

| CN | 101496709 A | 8/2009 |
| CN | 201414746 Y | 3/2010 |
| CN | 201445467 U | 5/2010 |
| CN | 103445730 A | 12/2013 |
| EP | 2671493 U | 12/2013 |

OTHER PUBLICATIONS

International Search Report of PCT/IT2017/000051 dated Aug. 17, 2017.

*Primary Examiner* — Monica S Carter
*Assistant Examiner* — Abbie E Quann
(74) *Attorney, Agent, or Firm* — Collard & Roe, P.C.

(57) ABSTRACT

Hot plate cleaner for floors including a handgrip, a handle, a tank for water, a main body shaped as a brush, a heating plate below the brush and a thermostat, and cleaning fabrics for the floor hooked below a sealing frame, adapted to be hooked and unhooked below the brush, with the interposition of a sandwich panel maintained in contact with the heating plate having a layer of polyurethane foam, placed between two polyester fabrics, and a waterproof element applied to the panel to let the water flow from the tank scatter on the sandwich panel to dampen it so to act as a tank in order to reach the same temperature as the heating plate and keep it unchanged until the panel dries and transmit the same temperature to the cleaning fabric.

2 Claims, 5 Drawing Sheets

Figure 1:
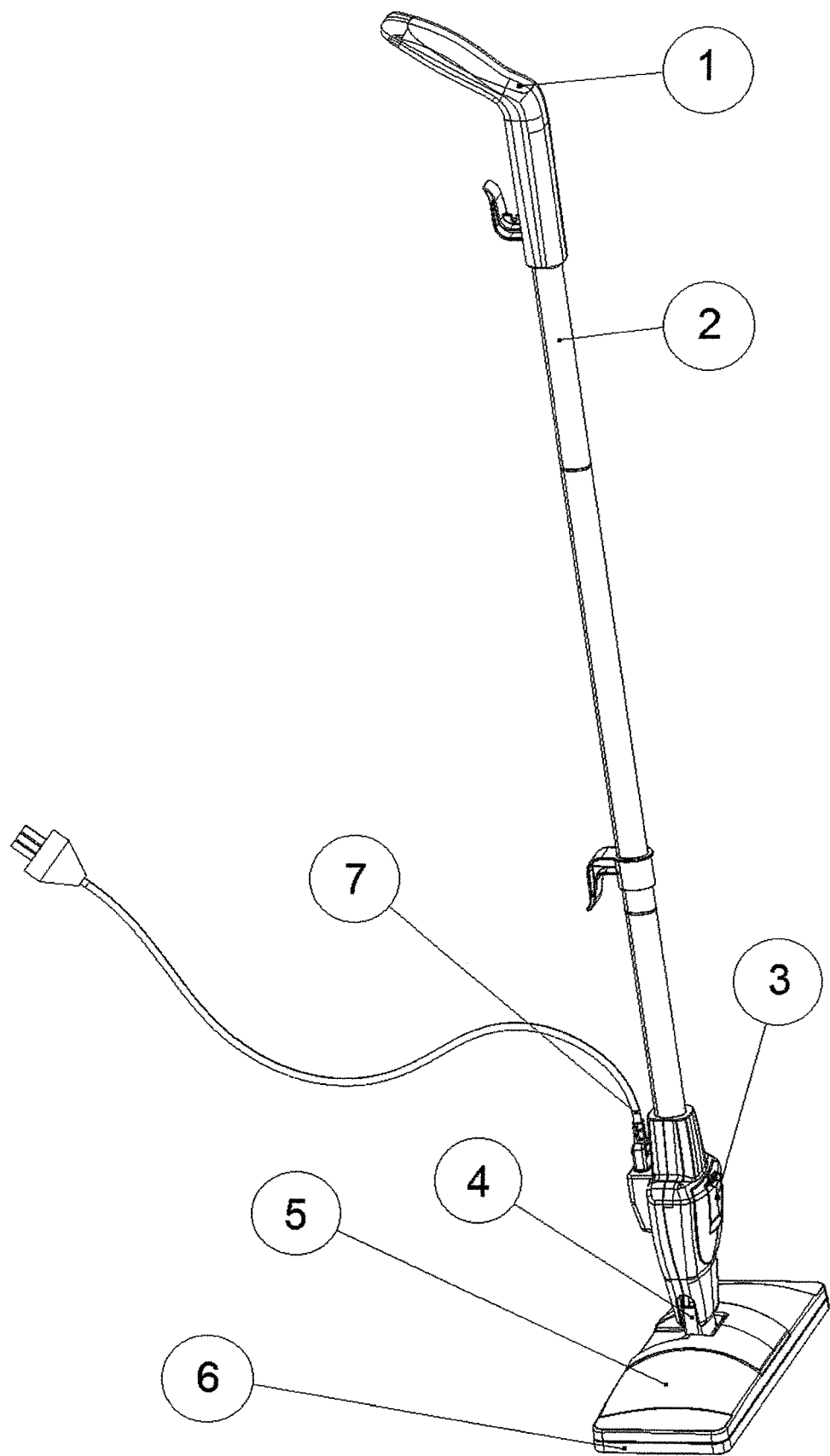

(51) Int. Cl.
*A47L 13/22* (2006.01)
*B32B 5/18* (2006.01)
*A47L 13/257* (2006.01)

(52) U.S. Cl.
CPC ............. *A47L 13/22* (2013.01); *A47L 13/225* (2013.01); *A47L 13/257* (2013.01); *B32B 5/18* (2013.01); *B32B 5/245* (2013.01); *B32B 2250/40* (2013.01); *B32B 2262/0276* (2013.01); *B32B 2266/0278* (2013.01); *B32B 2432/00* (2013.01)

(58) Field of Classification Search
CPC ........ A47L 11/34; A47L 13/22; A47L 13/225; A47L 13/257; B23B 5/245; B23B 2432/00

See application file for complete search history.

(56) References Cited

U.S. PATENT DOCUMENTS

| | | |
|---|---|---|
| 9,420,933 B2 | 8/2016 | Kellis et al. |
| 10,219,673 B2 | 3/2019 | Kellis et al. |
| 10,548,451 B2 | 2/2020 | Kellis et al. |
| 2013/0312212 A1* | 11/2013 | Kowalski ............ A47L 11/4086 15/322 |
| 2014/0165324 A1* | 6/2014 | Luo ...................... A47L 13/225 15/320 |
| 2014/0259478 A1 | 9/2014 | Conrad |
| 2014/0259510 A1* | 9/2014 | Conrad ................ A47L 13/225 15/319 |
| 2015/0117932 A1* | 4/2015 | Russell ................... A61L 2/232 401/196 |
| 2016/0242614 A9 | 8/2016 | Kellis et al. |

* cited by examiner

CLEANER WITH HOT PLATE FOR FLOORS PROVIDED WITH A SANDWICH PANEL FOR HEATING AND GRADUAL RELEASING OF THE WATER TO AN UNDERLYING CLEANING CLOTH

CROSS REFERENCE TO RELATED APPLICATIONS

This application is the National Stage of PCT/IT2017/000051 filed on Mar. 14, 2017, which claims priority to Italian Application No. 102016000027284, filed on Mar. 15, 2016, the disclosures of which are incorporated herein by reference. The international application under PCT article 21(2) was published in English.

This invention patent concerns a surface hot cleaning device whose characteristic is that of being provided with a heated plate and a special sandwich panel that is kept always in contact with the same heating plate preferably through a frame. Said panel absorbs a preset quantity of water supplied by a tank located above it and retains it while it is heated up to reach the temperature of the heating plate and releases it gradually onto the cleaning cloth located underneath.

Several hot cleaning devices are known that generally use steam generated by instantaneous vaporizers or pressure boilers. The generated steam is usually conveyed through output pipes towards the cleaning cloth located under the brush that will be in touch with the floor.

The disadvantage of all these devices is that the steam gets immediately cold when getting in touch with the cloth being in contact with the floor, thus losing the temperature that would be necessary for efficient cleaning; moreover, since steam continues to be released, the cloth gets increasingly wet and spills water on the floor, thus actually preventing proper cleaning.

These shortcomings are overcome by the new device provided with a heated plate and a special sandwich panel.

The new device for surface hot cleaning consists of a main body pivoted into a handle by means of a universal joint, a handgrip, a water tank and a power supply cable.

The main body is formed by a shell, preferably made of plastic, inside which a plate is installed, preferably made of aluminium, heated by a heating element and provided with a thermostat for adjusting the temperature, a frame with a sandwich panel that can be detached from said main body. The frame is fastened to the main body and keeps the sandwich panel in direct contact with the heating plate.

The device handle hosts the water tank, whose capacity corresponds to the water quantity necessary to dampen the sandwich panel. Said tank has a ball valve that locks the output hole under gravity, thus preventing water to get through when the handle is in vertical position. Only when the user starts using the device and the handle is moved to a slanted position, the ball will move and the valve will open the pipe and the water will start flowing towards the sandwich panel in a pipe connecting the tank to said panel, thus passing through the main hole of the heating plate.

The sandwich panel consists of two fabric-non-fabric cloths that resist to a temperature of at least 140° C. and an element in-between made of open-cell polyurethane foam with suitable density and thickness coupled to them. The panel has been conceived so that it can absorb and keep a certain quantity of water, thus acting as a tank for the absorbed water and releasing it gradually towards the cleaning cloth applied underneath.

The central area of the upper surface of this panel also hosts a waterproof element that lets the water coming from the tank flow down from the central hole in the heating plate in a scattered way along the edge of said element so that the sandwich panel can get wet and absorb water uniformly on its surface and not only on the central area.

When said panel is wet and kept in contact with the heating plate through the frame, it rapidly reaches the same temperature as the plate, about 100° C. that it will transmit on its turn to the cleaning cloth underneath.

The efficiency characteristics of the sandwich panel can be summed up in the following points:

it retains the preset quantity of water coming from the tank, thus avoiding dripping on the floor the entire surface is dampened uniformly it allows the fast and homogeneous heating of its entire surface it keeps the same temperature of about 100° C. for the entire duration of the cleaning operations by transmitting it to the cleaning cloth until it gets completely dry it improves the adherence to the floor of the cleaning cloths it cleans in depth and sanitises surfaces thanks to the high constant temperature transmitted to the cleaning cloth it allows using any type of cloth, even single-use ones floors dry up very fast the panel can be easily removed to wash or replace it thanks to the removable frame.

It also shows some safety features:

it prevents the direct contact with the heating plate, thus avoiding unwanted burns.

when the panel is dry, its surface is cold even when the plate is hot and therefore the device can remain on and in contact with the floor without any risk of spoiling it.

This device can also be used when it is cold with 'dust-catching' cloths applied under the sandwich panel to remove dust from the floors like a normal dust mop.

As an explanation but with no limitations of the characteristics of this invention, an example is now described of construction of the system according to this invention with reference to the enclosed drawings:

FIG. 1 shows the entire hot plate cleaner consisting of:

A handgrip (detail 1), a handle (detail 2), a tank (detail 3), a main body (detail 5), a universal joint (detail 4), a heating plate (detail 6), and a power supply cable (detail 7).

Figure 2:
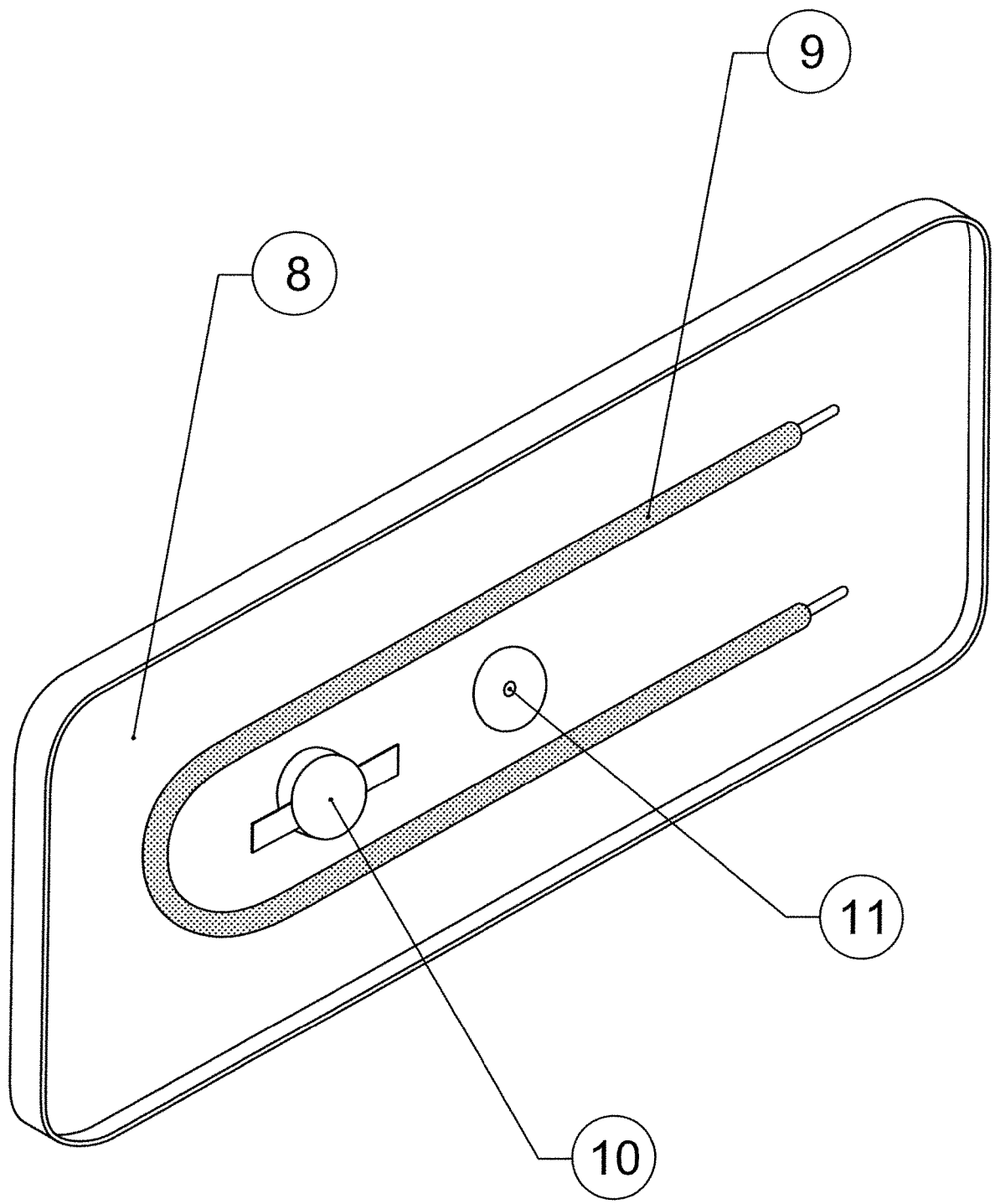

FIG. 2 shows the inner part of the heating plate (detail 6) where (detail 8) is the aluminium body, (detail 9) the heating element, (detail 10) the thermostat, and (detail 11) the hole for water flow.

Figure 3:
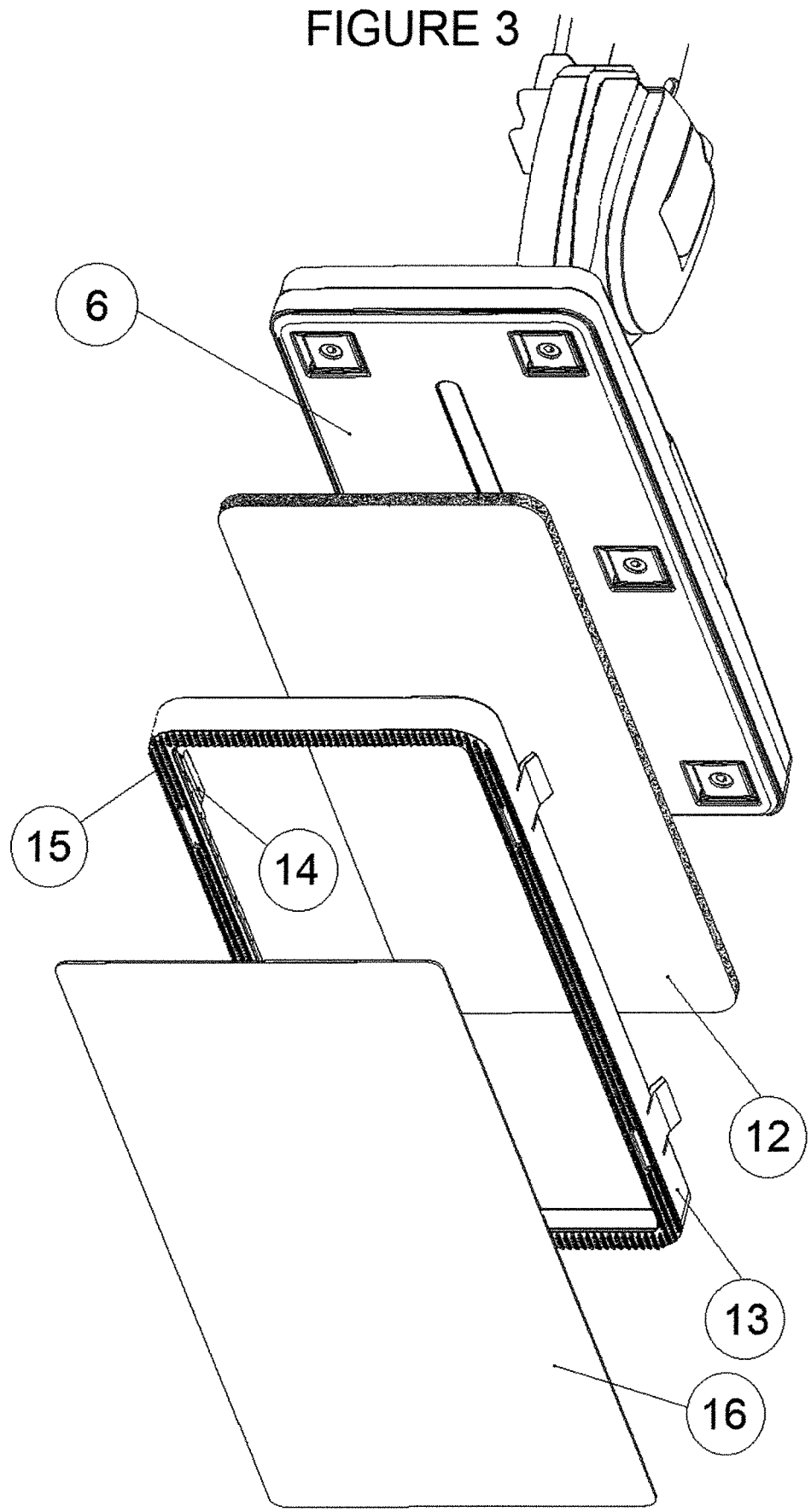

FIG. 3 shows in this order the heating plate (detail 6) seen from below, the sandwich panel (detail 12), the frame holding the sandwich panel (detail 13) with the fastening elements (dr. 14) to be fastened to the brush (detail 5) and hooks along the lower edge (dr. 15) to hook the cleaning cloths (detail 16).

Figure 4:
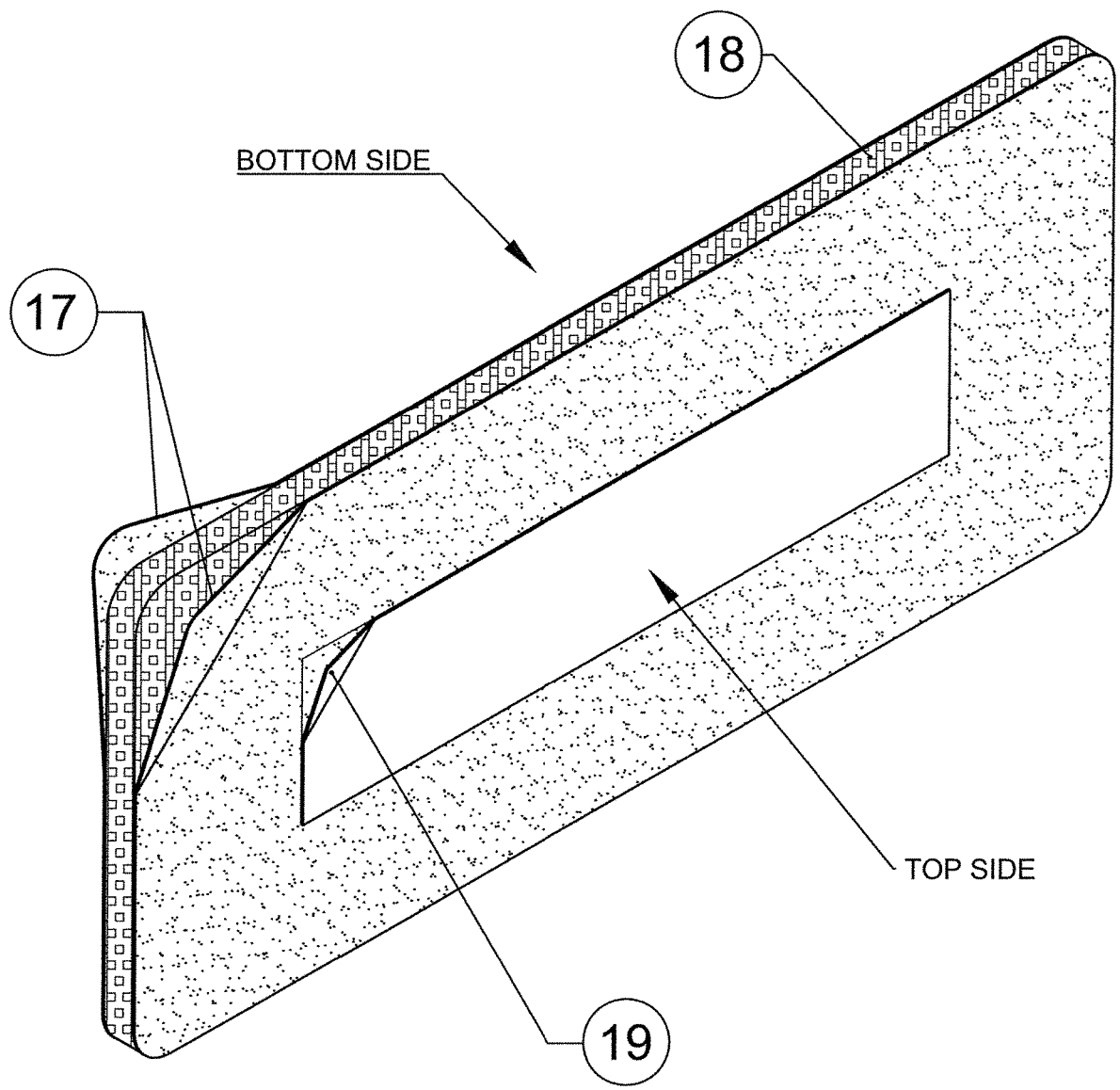

FIG. 4 shows a section of the composition of the sandwich panel (detail 12) that is formed by two external fabric-non-fabric elements (detail 17) resistant to a temperature of at least 140° C. coupled with a central element made of open-cell polyurethane foam (detail 18) whose density and thickness are suitable to the purpose, and a waterproof element (detail 19) applied to the centre of said panel on its upper surface, i.e. the surface that gets in contact with the heating plate.

Figure 5:
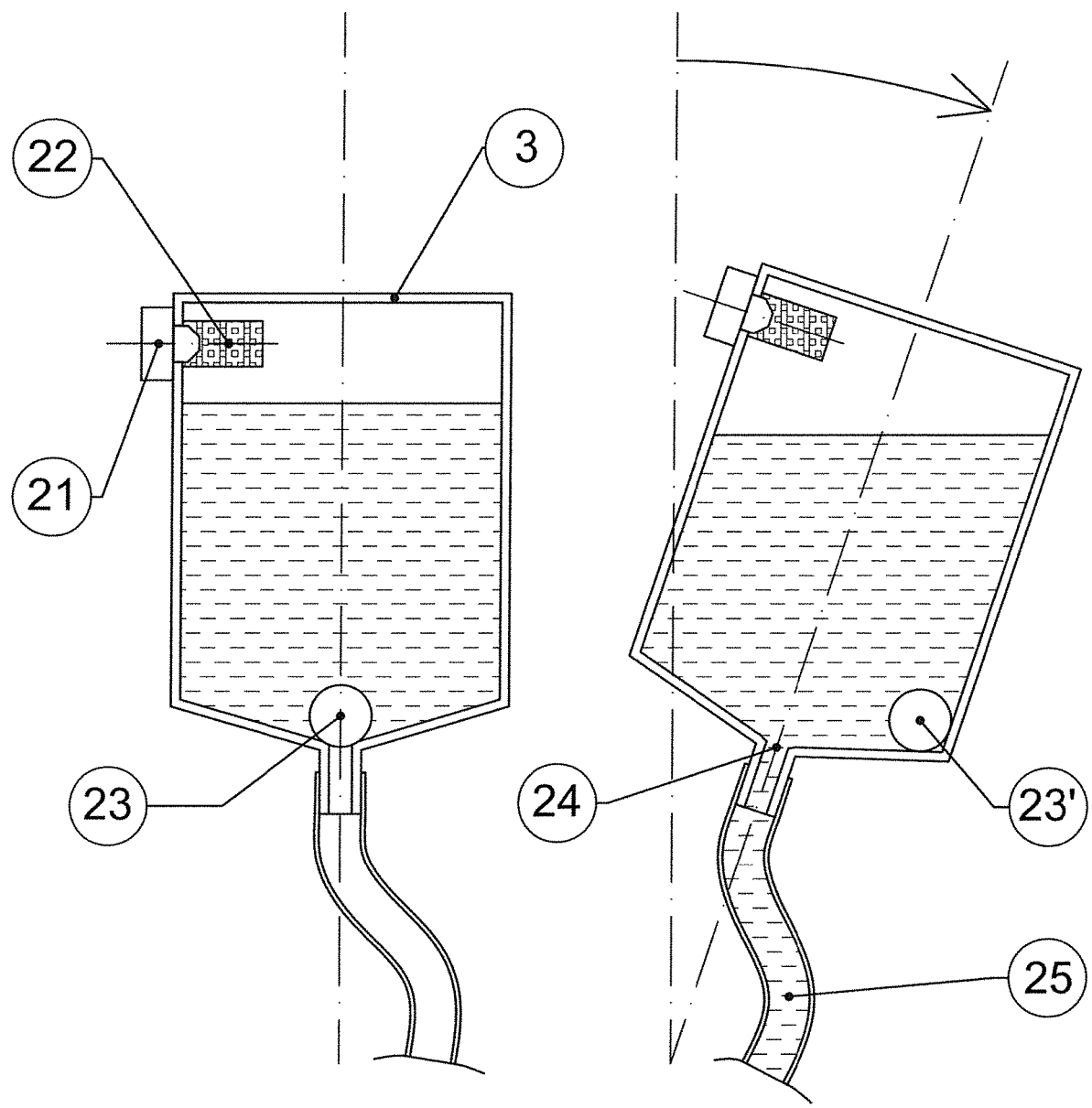

FIG. 5 shows the water tank (detail 20), provided with a plug (detail 21) and a filter (detail 22) inside which a ball valve is installed (detail 23) that moves under gravity and prevents water from flowing when it is in vertical position (detail 24), while when it is in a slanted position (detail 23') it moves and opens the hole (dr. 24).

The device ready for use will be already equipped with the sandwich panel (detail 12) assembled to the brush (detail 5) by means of the frame (detail 13).

The tank (detail 3) is filled with water up to the level marked on the same tank. The device is turned on by connecting the cable (detail 7) to the grid that energises the heating element (detail 9) located on the heating plate (detail 6). The plate temperature is adjusted by the thermostat (detail 10) fastened to the same plate. Once the system has reached the preset temperature, it will inform the user by means of a beeper and then the user can start the cleaning operations after applying the cleaning cloth (detail 16) under the sandwich panel (detail 12).

When the user tilts the handle (detail 2) and the tank fastened to it at the same time and starts moving the device, the ball valve (detail 23) located in the tank (detail 3) will move under gravity and will thus open the hole (detail 23'/24) and the water will flow through the connection pipe (detail 25) towards the sandwich panel (detail 12) that is located under the heating plate (detail 6), which will get wet and reach the temperature of the plate very fast. The waterproof element (detail 19) located in the sandwich panel (detail 12) has the purpose to scatter the water coming from the tank (3) through the connection pipe (25) and the hole in the plate (11), along its edge, thus favouring the homogeneous dampening of the panel instead of concentrating the water only in the centre where there is the hole for the water flow (detail 11).

The special composition of the sandwich panel shown in FIG. 4 allows retaining water, thus acting as a tank of the absorbed water, keeping it at the same temperature as the heated plate (detail 6) and gradually releasing it towards the cleaning cloth underneath (part. 16) at a temperature of about 100° C.

The special features and advantages deriving from the use of the innovative sandwich panel can be summed up as follows:

it absorbs the water coming from the tank in a homogeneous way on its entire surface it retains the water thus avoiding dripping on the floor it allows the fast heating of the entire panel it keeps the temperature unchanged for the entire cleaning cycle (about 100° C.) until the panel has dried up completely.

it improves the adherence to the floor of the cleaning cloths the floors are not dampened more than necessary and get dry very rapidly it allows the use of any cleaning cloth including the single-use ones it has a more effective cleaning and sanitizing action on the surfaces thanks to the high and constant temperature transmitted to the cleaning cloth the panel can be easily removed to wash or replace it thanks to the removable frame.

It also shows the following safety features:

it prevents the direct contact with the hot plate thus avoiding unwanted burns when the panel is dry, it remains cold even when the plate is hot and therefore the device can remain on and in the same place on the surface without causing damage to it.

This brief explanation is sufficient to an expert to build the invention and as a consequence, the actual application can show some variations that do not change the substance of the idea.

The invention claimed is:

1. A cleaner with hot plate for floors comprising:
   a handgrip (1),
   a handle (2),
   a tank (3) for containing water,
   a main body shaped as a brush (5), into which the handgrip (1) is pivoted by means of an universal joint (4);
   a heating plate (6) fixed below the body (5) and provided with a heating element (9) for heating the plate (6) and having a thermostat (10) for regulating temperature, as well as an electrical supplying cable (7) for the heating element (9); and
   cleaning fabrics (16) for the floor, applied to and supported below said heating plate (6),
   wherein said cleaning fabrics (16) are hooked below a sealing frame (13) below said body (5), said sealing frame connected to a sandwich panel (12) kept in direct contact with the heating plate (6); and
   wherein said sandwich panel (12) comprises at least a layer of polyurethane foam (18) having a suitable thickness and density, placed between two polyester fabrics (17) and coupled thereto, and a waterproof element (19) applied centrally to the sandwich panel (12) onto a surface coming in contact with the heating plate (6); the water coming from the tank (3) drains through a connection pipe (25) and at least a central passage (11) of the heating plate (6) in a scattered manner onto the sandwich panel (12), in such a way that the sandwich panel is wetted by the water drained uniformly on to the surface thereof;
   wherein said sandwich panel (12) is adapted to retain the water and heats to a same temperature of the heating plate (6); by maintaining the same temperature, the sandwich panel is dried at approximately 100° C. and transmits heat to the underlying cleaning fabric (16); and
   wherein said water tank (3) is provided with a plug (21) and a filter (22), into which a ball valve (23) is installed and is operated by gravity; when said ball valve is in a vertical position thereof, a water passage (24) from the tank (3) toward the connection pipe (25) prevents the sandwich panel (12) from becoming wet; wherein when said ball valve is in an oblique position and displaced from said vertical position thereof (23'), said water passage (24) allows the sandwich panel (12) to become wet.

2. The cleaner with said hot plate according to claim 1, wherein said water tank (3) is integral with said handle (2), so that when said handle is vertical, said ball valve (23) is in the vertical position thereof, and when said handle (2) is angled, said ball valve (23) is in the oblique position thereof.

* * * * *